United States Patent
Galerne et al.

(10) Patent No.: US 11,302,098 B2
(45) Date of Patent: Apr. 12, 2022

(54) SYSTEM FOR IDENTIFICATION OF MARINE MAMMALIAN SPECIES PRESENT AT AN OFFSHORE CONSTRUCTION SITE

(71) Applicant: Oceaneering International, Inc., Houston, TX (US)

(72) Inventors: Eric H Galerne, Houston, TX (US); Miles Roden, Houston, TX (US); Nat Spencer, Houston, TX (US)

(73) Assignee: Oceaneering International, Inc., Houston, TX (US)

(*) Notice: Subject to any disclaimer, the term of this patent is extended or adjusted under 35 U.S.C. 154(b) by 20 days.

(21) Appl. No.: 16/926,283

(22) Filed: Jul. 10, 2020

(65) Prior Publication Data
US 2021/0192176 A1 Jun. 24, 2021

Related U.S. Application Data

(60) Provisional application No. 62/950,836, filed on Dec. 19, 2019.

(51) Int. Cl.
*G06V 20/13* (2022.01)
*H04W 84/18* (2009.01)
*A01K 61/90* (2017.01)
*G06Q 50/08* (2012.01)

(52) U.S. Cl.
CPC .............. *G06V 20/13* (2022.01); *A01K 61/90* (2017.01); *H04W 84/18* (2013.01); *G06Q 50/08* (2013.01)

(58) Field of Classification Search
CPC ...... G06K 9/0063; A01K 61/90; G06V 20/13; H04W 84/13

USPC ....................... 455/67.11, 456.1, 414.1, 67.7
See application file for complete search history.

(56) References Cited

U.S. PATENT DOCUMENTS

| | | | | |
|---|---|---|---|---|
| 2011/0301786 | A1* | 12/2011 | Allis | G05D 1/0011 701/2 |
| 2013/0070079 | A1* | 3/2013 | Zitterbart | G06K 9/6247 348/81 |
| 2015/0323932 | A1* | 11/2015 | Paduano | G05D 1/0676 701/3 |

(Continued)

*Primary Examiner* — John J Lee
(74) *Attorney, Agent, or Firm* — Maze IP Law, P.C.

(57) ABSTRACT

A system for supporting timely, informed decision making with respect to commencing and terminating offshore construction operations within a predetermined zone using a situational awareness tool not compromised by weather, poor-visibility, or a simple protected species observer (PSO) conundrum of not being able to see all things at all times, and for identification of marine mammalian species present at an offshore construction site that is sensor and platform agnostic comprises a plurality of sensors, a predetermined subset of the plurality of sensors operational without requiring daylight, the sensors operative to deliver data from which targets are determined and from which their position information can be derived; a data communicator operative to allow provide real-time data to a data viewer; a data processor operatively in communication with the plurality of sensors and the data communicator; and a display operatively in communication with the data communicator and operative to display a representation of real-time data, the display comprising a visual interface operatively connected to the data processor and comprising a human machine interface centralized display.

16 Claims, 4 Drawing Sheets

(56) References Cited

U.S. PATENT DOCUMENTS

2017/0259115 A1* 9/2017 Hall ........................ H04Q 9/00

* cited by examiner

SYSTEM FOR IDENTIFICATION OF MARINE MAMMALIAN SPECIES PRESENT AT AN OFFSHORE CONSTRUCTION SITE

RELATION TO OTHER APPLICATIONS

This application claims priority through U.S. Provisional Application 62/950,836 filed on Dec. 19, 2019.

BACKGROUND

Currently, piling is limited to hours when human eyes can identify marine mammalian species. Furthermore, construction of offshore wind farms has installation processes that are noisy and potentially harmful to marine mammals near ongoing pile driving operations. Regulations and guidelines that protect marine mammals from these loud disturbances require knowledge of protected mammalian species when they are within a specific distance of foundation piling activities known as an exclusion zone. The regulations stipulate that if the mammals are within the exclusion zone, pile driving activity must stop. Regulations mandate that operations can only occur when humans can visually see mammals. As such, restricted visibility operations (nighttime and fog) prohibit pile driving activity. Limiting pile driving activity increases the cumulative negative impact the operation has on the marine environment.

FIGURES

Various figures are included herein which illustrate aspects of embodiments of the disclosed inventions.

DESCRIPTION OF EXEMPLARY EMBODIMENTS

As used herein, an "actor" may comprise physical vessels, aircraft, autonomous underwater vehicles (AUVs), monopiles, or detected mammals. "Object" may comprise inanimate objects which include geofencing perimeters represented by the exclusion zone, monitoring zone, outer zone, bubble curtains that are positionally static and relative to the operation's epicenter. "Software controls" may comprise display menu button regions where such are used to control software operations.

Figure 1:
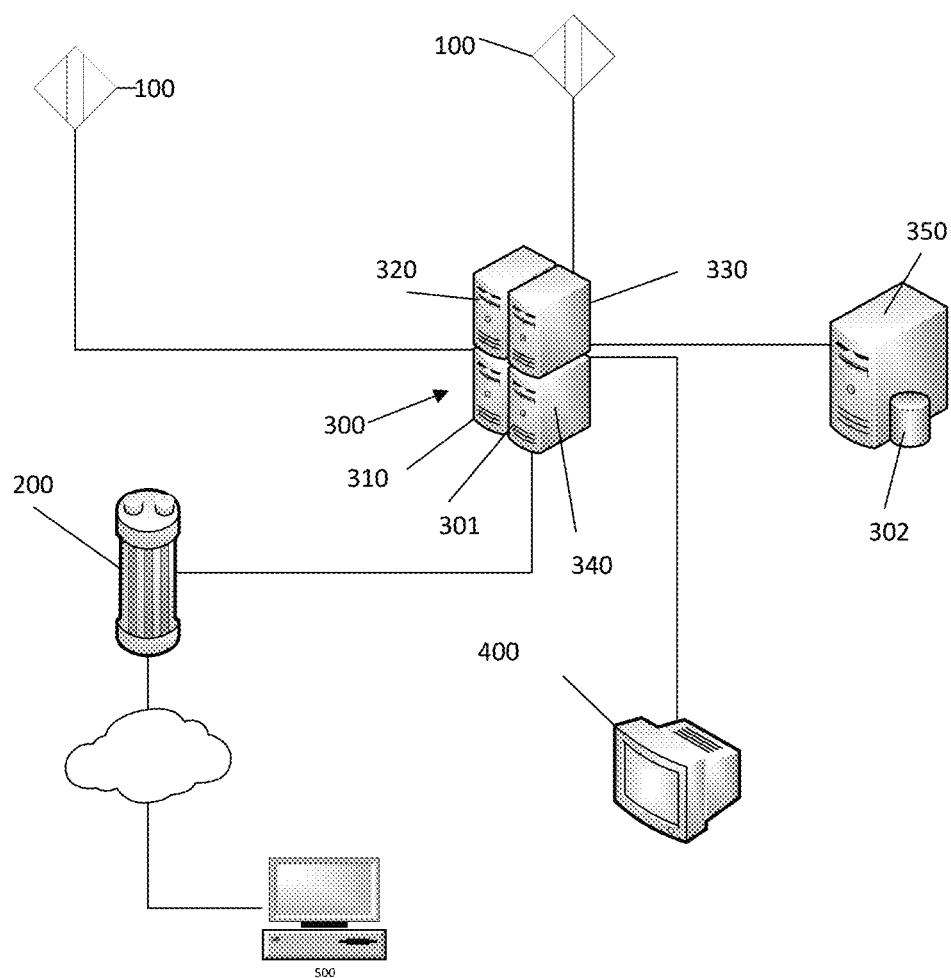
FIG. 1 is a schematic view of an exemplary system.

In a first embodiment, referring generally to FIG. 1, system 1 supports timely, informed decision making with respect to commencing and terminating offshore construction operations within a predetermined zone using a situational awareness tool not compromised by weather, poor-visibility, or a simple protected species observer (PSO) conundrum of not being able to see all things at all times, and for identification of marine mammalian species present at an offshore construction site that is sensor and platform agnostic. The predetermined zone typically comprises one or more exclusion zones, monitoring zones, operational zones, outer zones, bubble curtains, or the like, or a combination thereof.

Figure 3:
FIG. 3 is a schematic view of an exemplary system display system.
Figure 4:
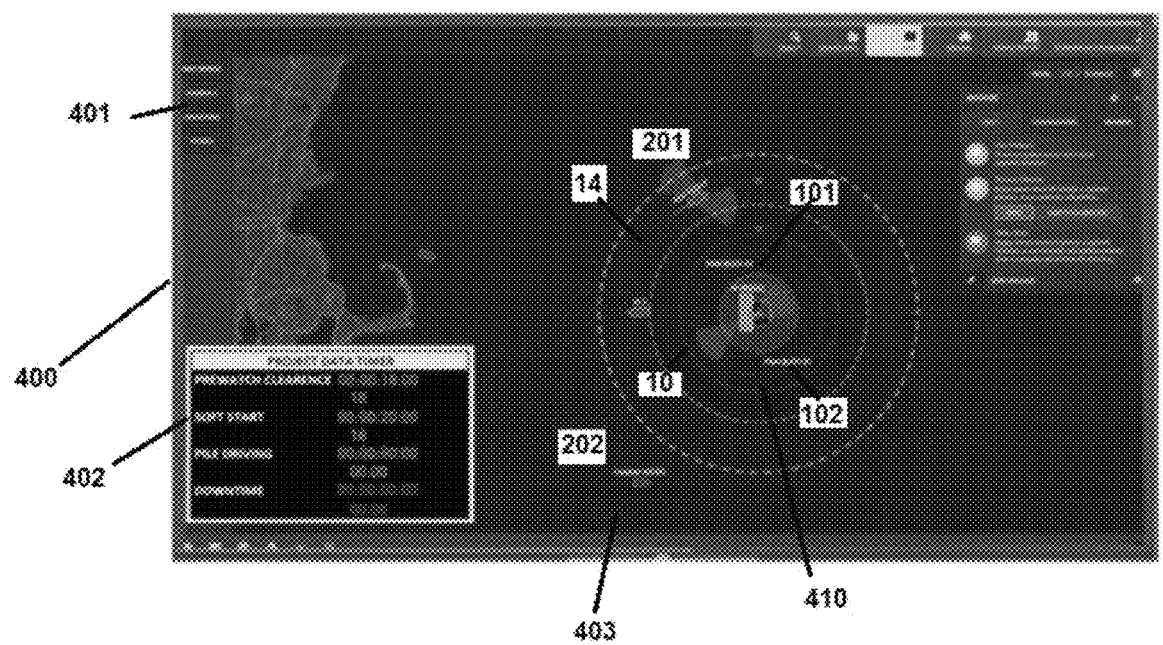
FIG. 4 is a view of an exemplary system display.
Figure 5:
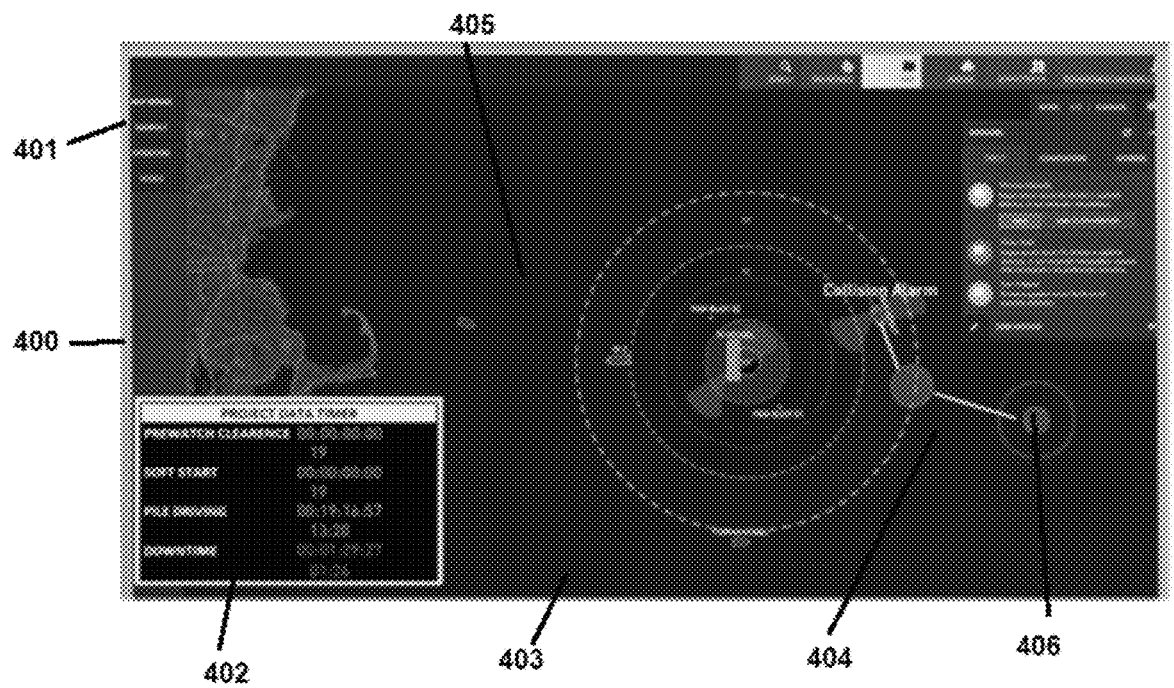
FIG. 5 is a view of an exemplary system display.
Figure 6:
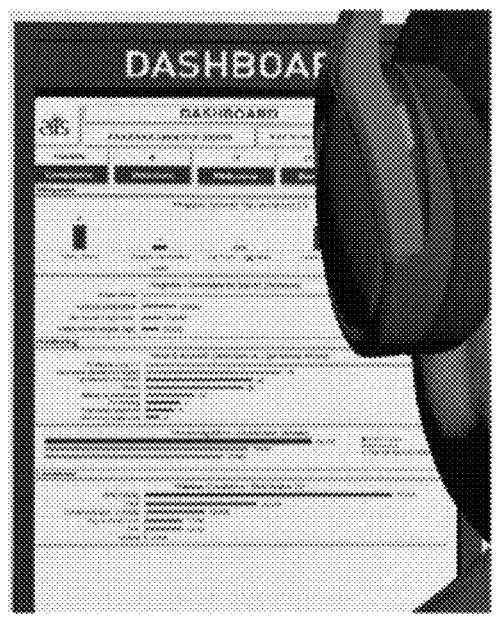
FIG. 6 is a view of an exemplary system display.

In an embodiment, system 1 comprises a plurality of sensors (collectively referred to herein as callout "100" and individually as 101, 102, 103, and the like), where a predetermined subset of the plurality of sensors 100 is operational without requiring daylight and where at least one sensor 100 is operative to deliver data from which targets are determined and from which their position information can be derived; one or more data communicators 200 operative to allow provide real-time data to a data viewer, e.g. human operators 520 (FIG. 3); one or more data processors 300 operatively in communication with the plurality of sensors 100 and data communicator 200; and one or more displays 400 operatively in communication with data communicator 200 and data processors 300 and operative to display a representation of real-time data, display 400 comprising a visual interface (illustrated in, e.g., FIG. 3-5) operatively connected to data processor 300 and comprising a human machine interface centralized display (illustrated in, e.g., FIG. 3-5). In certain embodiments, the predetermined set of specific information is useful to aid in a making a timely, informed decision with respect to commencing and terminating pile driving operations as prescribed by legislation, such as prescribed in the Endangered Species Act and the Marine Mammal Protection Act effective as of the date of filing this application.

In embodiments, the plurality of sensors 100 comprises an audio sensor, a visual sensor, a geospatial sensor, or the like, or a combination thereof. In other embodiments, the plurality of sensors 100 comprises subsea passive acoustic sensor 101, subsea active acoustic sensor 102, passive acoustic monitoring towed array 103, surface camera 104, thermal imaging camera 105, passive acoustic monitoring static array 106, acoustic buoy 107, a set of sensors 108 on unmanned platform 20, radar 109, automatic identification system (AIS) 110, a GPS 111, or the like, or a combination thereof. If present, thermal imaging camera 105 may comprise a cooled mid-wave infrared (MWIR) camera or a long wave infrared (LWIR) thermal camera.

In certain embodiments, one or more sensors 100 may be located on platform 20, which may be an unmanned platform, a manned marine vessel 21, an unmanned aerial vessel (UAV) such as aerial drone 201, unmanned marine vessel 202, an autonomous underwater vehicle (AUV) (22), towed array 103, floating buoy 101, an installation vessel, an unmanned surface vessel, ocean buoy 102, or a satellite, or the like, or a combination thereof.

If present, remote sensor 1100 may comprise or otherwise be part of aerial drone 201, an AUV sensor, a UAV sensor, passive acoustic monitoring hydrophone (PAM) sensor 101, a manual data entry sensor, PAM audio channel sensor 102, a mammal vocalization recorder, an MWIR camera recorder, a monopile center, or the like, or a combination thereof.

Data processors 300 are operatively in communication with the plurality of sensors 100. In embodiments, data processors 300 comprise software and/or hardware components defining or otherwise implementing one or more real time monitors 310 operatively in communication with the plurality of sensors 100; one or more recorders 320 operative to record visual and audio data gathered from the plurality of sensors 100 in real time and provide a data stream comprising the visual and audio data gathered from the plurality of sensors 100; one or more data stream processors 330 operative to process the data streams received from recorder 320 into a predetermined set of specific information; and one or more data communicators 340 operatively in real time communication with data stream processor 330.

Data processor 300 may further comprise an indexed database resident in data store 302 defining an information repository comprising collected sensory information, where the indexed database is operatively in communication with data stream processor 330. In these embodiments, and others, data output processor 350 is typically operatively in communication with data processor 300 and configured to create an event output log and a set of alarms. These alarms may comprise a proximity warning that an object or actor is near a monitoring zone or an exclusion zone, an at-risk target broadcast, a collision/strike alarm, a speeding alarm, a time-stamped alarm log, control signals, or a pile driver alarm sound, or the like, or a combination thereof.

Figure 2:
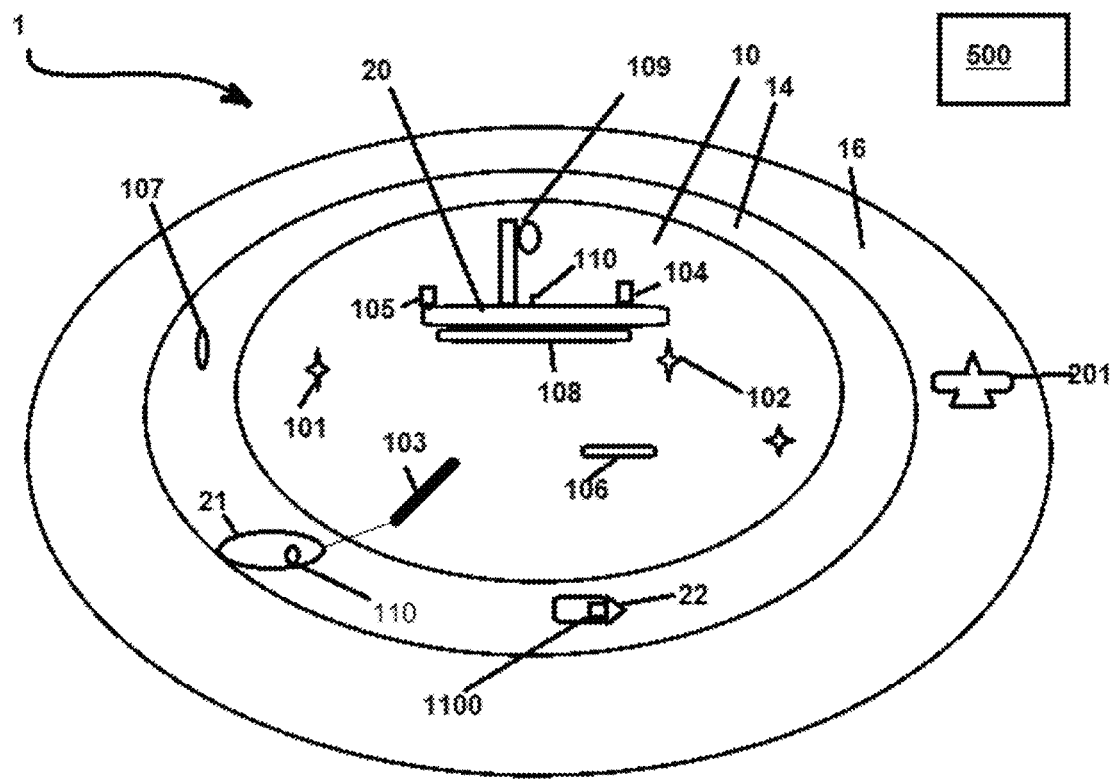
FIG. 2 is a schematic view of zones and components of an exemplary system.

Data communicator 340 may be operatively in communication remote sensor 1100 (FIG. 2), if such is present, such as one associated with aerial drone 201 (FIG. 2) or unmanned marine vessel 22 (FIG. 2).

In systems comprising remote sensors 1100, system 1 typically comprises data input port 301 and remote sensor 1100 is typically operatively in communication with data input port 301. In systems comprising remote systems 500, data communicator 340 may also be operatively in communication a manually or automatically, e.g. programmatically, adjustable remote screen associated with such remote systems 500 and further configured to allow remote operation from a data command center such as by accepting one or more sets of commands to be forwarded to data processor 300.

Data communicator 340 may further comprise an internet connection to allow data communication, a voice-over-internet satellite transceiver, or the like, or a combination thereof.

In embodiments, the data streams comprise a primary video data stream comprising a video image derived from a heat signature of a time stamped and recorded scene from the environment in which system 1 is deployed; a second video data stream comprising a targeting contact that is referenced to a camera's field of view which produces a relative range and bearing that is post processed with time stamping and real world coordinate conversation for display purposes; and a third video data stream generated by processing by a marine mammal module of the data processor to characterize the image along a whole spectrum of possibility, depending on resolution and machine learning algorithms, with the ultimate goal of characterizing the target as a protected or unprotected species. Incoming data streams may further comprise automatic identification system (AIS) data comprising a vessel name, an IMO number, and a position, the method further comprising the AIS data on the screen. Multiple time-stamped acoustic streams may be processed to derive positioning data.

The human machine interface (generally at FIG. 3-5) may comprise centralized display similar to display 510 comprising a predetermined set of representations of layers of data; an assigned slave display also similar to display 510 for other data streams; representation of real-time monitoring of multiple targets relative to construction activities; and representation of real-time mitigation action across the entire field of operation. In most embodiments, display 400 comprises representation of an exclusion zone radius 410, a first far field bubble curtain location, one or more second far field bubble curtain locations, or a near field device.

Representation of real-time data may comprise selectively added or removed visually perceptible data layers representative of data present in the received data stream on demand and display 400 is operative to display the representation of real-time data further by providing data layer selector 401.

In embodiments, representation of real-time data may comprise a representation of an automatic identification system (AIS) grid, a day/nighttime display option, an exclusion zone (EZ) designation, a heads up or gyro display orientation, a set of target symbols, or the like, or a combination thereof.

Display 400 typically comprises region 402 for displaying a predetermined set of secondary displays for other data streams; region 403 for representation of real-time monitoring of multiple targets; and region 404 for representation of real-time mitigation across an entire field of operation.

In addition, display 400 typically comprises screen region 405 populated with collated data in map form visualizing nearby mammals and marine traffic and indicator 406 as to whether or not piling can occur based on proximity of marine mammals.

In most embodiments, display 400 comprises a configurable, predetermined set of color indicators indicative whether or not operations can continue, the configurable, predetermined set of color indicators indicative of a border associated with pile driving must stop; a border associated with pile driving is allowed, but mammals are approaching the operation; a border indicative that operations are permissible; ambient noise and sound pulses generated by pile driving operation; mediation from near field and far field which may be visualized by shade variations that dissipate across display 400; a numeric colored spectrum bar that displays the noise level band; or the like, or a combination thereof.

In the operation of exemplary methods, referring back to FIG. 1, sensor data obtained regarding a set of subsea conditions may be presented, in real-time, giving operator 520 (FIG. 3) an ability to control, commence, and/or terminate certain construction or similar operatives, e.g. pile driving operations, in real-time in compliance with a regulatory requirement by using one or more displays 400 and/or remote displays 510 (FIG. 3) associated with a situational awareness tool not compromised by weather, poor-visibility, or the simple protected species observer (PSO) conundrum of not being able to see all things at all times using system 1 as described above.

Typically, system 1 is installed at a subsea location comprising an offshore operations area. Although typically installed more-or-less in a fixed location, system 1 may be used in a marine surveying mode of operation comprising a dynamic, moving epicenter scenario in which the epicenter is continuously moving along with a survey vessel along the survey lines and route where geofencing that is relative to the survey vessel moves along with it. Alternatively, system 1 may be used in a marine construction mode of operation comprising a static and stationary epicenter scenario in which the epicenter is static so all its geofencing, relative to a structure such as a monopile, is stationary.

Once installed, the plurality of sensors 100 and real time monitor 310 are used to obtain data related to sensed sea surface and subsea objects. Information present in a set of incoming data streams collected from sensors 100, which are tasked with monitoring ongoing mammal and human activities within the offshore operations area, are aggregated and recorded using recorder 320. In most embodiments, the plurality of sensors 100 are used to obtain data related to sensed objects within a defined area at defined intervals, providing consistency, accuracy, and documenting the findings regularly. Both visual and audio mammal detection techniques may be leveraged from the sensors as well as aggregating AIS and radar targeting data in order to identify all surface activity in the field.

In certain embodiments, a predetermined set of the incoming data streams related to activity in the operational area are time stamped. Data contained within the set of incoming data streams, which may comprise time stamped data streams, are organized and recorded such as by using data stream processor 330.

Data stream processor 330 may also be used to perform algorithmic manipulation on the organized and recorded data to create a set of data which distinguish between a predetermined set of marine mammals and subsea noise created by installation of subsea foundations, e.g. those used in offshore wind farms, and the construction activity it creates. Generally, performing algorithmic manipulation may comprise characterizing a target for a video stream once detected. It may also comprise creating a statistical record of actual time spent in a set of operations using data in the database, where the data comprise raw data streams from the various sensors, supplemental data, and data derived and calculated from the incoming data streams; drilling down into the data to reveal a set of specific take instance data such as species, time, date, and other circumstances; and presenting drilled down data on display 400 and/or remote display 510 to show a predetermined set of key metrics in real time as well as an underlining data set that includes the data regarding its gathering and calculation. Processing algorithms may further help characterize all field activity in the exclusion and outer zones including target tracking and predictive analysis and monitoring marine traffic restrictions to benefit strike avoidance.

If present, remote system 500 may be located distally from the subsea location where system 1 is installed and data communications established between remote system 500 and data communicator 340.

A video application may be present and configured to play displayed information based on a time or event basis. Although displaying the set of data on display 400 is to a single display in real time, set of data may be presented on display 400 and/or remote display 510, typically by using capabilities of data stream processor 330. Displaying the set of data on display 400 and/or remote display 510 may comprise displaying a user interface which enables interested and permitted parties to view activity in the operational area in real-time from remote location 500. The processed data may be presented in an actionable format in real time via a configurable interface that enables users to parameterize requirements to suit relevant legislation. This may include using a visual user interface to display moving and stationary targets, mammals detected, and acoustic noise being generated.

As noted above, displaying the set of data on display 400 and/or remote display 510 may comprise providing indications of data via a colored portion of display 400 and/or remote display 510 indicating the current permitted state of the operation. In contemplated embodiments, the colored portion may comprise a first color indicating a first condition, e.g. no noise generating activities allowed; a second color indicating a second condition, e.g. be prepared to shut down noise generating operation; and a third color indicating a third condition, e.g. noise operation can be performed.

Data may be displayed in real-time on display 400 and/or remote display 510 via a downward-facing top view of the operating area where the data comprise representations of objects and actors in the operating area along with the user defined geofencing perimeters displayed relative to each other. In embodiments, the displayed set of data comprises a plurality of data layers where each layer is representative of a predetermined actor or object in a relative area of operations as well as software controls. The plurality of layers is typically able to be superimposed on each other and each layer comprises its own input, processing, and output routines used to perform its function. In embodiments, the plurality of layers comprises a control layer, comprising visible screen controls to operate the software system; a geo-graphic layer, comprising a vector-based electronic chart display and information system (ECDIS) displaying a geodetic map; an epicenter and relative objects layer, comprising a visual representation of zone perimeters of the predetermined zone; an AIS layer, comprising representations of objects transmitting automatic identification system (AIS) data; a target visual layer, comprising representations of targets derived from IF camera data streams; an audio layer, comprising PAM targets derived from processing PAM input data streams; a database display layer, comprising a set of sound, timer, and regulatory information table displays; a chat communications layer, comprising representations of and providing access to a system chat facility which may be a closed or otherwise secure system chat facility; an intuitive display notification layer, comprising a status border and alarm display; or the like, or a combination thereof.

In addition, once processed, incoming data may cause an alarm to be developed based on the processed incoming data and the alarm to be recorded and/or displayed. The alarm may arise from detecting an object or actor nearing the monitoring or exclusion zone and generating a proximity alarm if the nearing is within a predetermined range and its development comprise predicting a course of every actor in the field, extrapolating future positions based on current course and speed, and sounding a collision/strike alarm when the bearing of any object intersects a protected species course; calculating a ground speed of an actor in the operational areas using GPS data and, based on that ground speed and its locations, applying a speed rule and determining a violation in real time; or detecting a construction noise such as a pile driving noise and sounding an appropriate alarm sound, e.g. a pile driving alarm, if the system indicates an exclusionary or prohibitory state, e.g. a non-pile driving state.

A communication facility may be embedded at a predetermined local or remote location and the set of data communicated to remote location 500. Communication between remote location 500 and the embedded communication facility, including allowing real time on-screen chat functionality using the embedded communication facility between system observers such as 520, may be established to improve coordinated awareness and response to situational events.

In embodiments, remote system 500 comprises a remote camera which may be adjusted to improve its detection and characterization capability of, e.g. objects detected by system 1. In these embodiments, a machine learning capability embedded in a marine mammal module of data processor 300 may be used to add data from the remote camera to database 302 which may comprise data indicative of recognizable features that help classify targets as specific species.

In certain embodiments, remote system 500 may comprise a remote hydrophone whose placement a water column may be adjusted or whose gathering frequency, wavelength, velocity, or amplitude characteristic of a sound wave detected by the remote hydrophone may be adjusted.

If hydrophones are present, multiple hydrophones may be used to acquire sound from a plurality of sources at various frequencies and power levels. Typically, each passive acoustic data stream from each hydrophone is time stamped and recorded as it is fed to data processor 300. Each recorded timestamped passive acoustic data stream is then typically processed to filter out mammal utterances so range and bearing of the sources can be determined and the acquired sound used to determine target range and bearings. Data reflective of the determined range and bearing is typically used to post process conversion to real world coordinates for display.

If the incoming data streams comprise range and bearing, the range and bearing data are typically converted to real-world coordinates and the real-world coordinates plotted on display 400, 510.

If present, data in time-stamped database 302 of the incoming data streams are time stamped to allow real-time and post-time verification and auditing of an operation's regulatory compliance.

The displayed set of data may be collated in map form to allow visualizing sensed nearby mammals and marine traffic.

In embodiments, post construction field surveillance and patrol may be performed such as via aerial drones 201 and/or unmanned vessels 22, sensor platforms on unmanned vessels and AUVs, sensor types including underwater imaging sonar systems, or the like, or a combination thereof.

In certain embodiments, use of system 1 may further comprise centralizing collection, processing, and dissemination of a unique plan view of the operational area that denotes a set of key exclusion and outer zones and heightens situational awareness for the PSOs tasked with approving and halting pile driving activities based on mammal presence in the operational area. Additionally, third party, manually sighted data may be allowed to be integrated into the system database by providing the manually sighted data into the system targeting cameras and redirecting a system targeting camera to the location to verify the sighting.

In embodiments, database 302 may be populated with project information, time analysis, and targeting data beneficial to project personnel as well as to a scientific community; and a query allowed to be run on database 302 to extract information that may be pertinent for reporting, performance analysis, and planning of future operations, including queries that can be run on the database to extract data based on selection and formatting criteria defined in the search query.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A system, comprising:
   a) a plurality of sensors, a predetermined subset of the plurality of sensors operational without requiring daylight, the plurality of sensors operative to deliver data comprising target description data and target position data;
   b) a first data communicator operative to provide real-time data to a data viewer;
   c) a data processor operatively in communication with the plurality of sensors and the data communicator, comprising:
      i) a real time monitor operatively in communication with the plurality of sensors;
      ii) a recorder operative to record visual and audio data gathered from the plurality of sensors in real time and provide a data stream comprising the visual and audio data gathered from the plurality of sensors;
      iii) a data stream processor operative to process the data stream received from the recorder into a predetermined set of specific information; and
      iv) a second data communicator operatively in communication with the data stream processor and the first data communicator in real time; and
   d) a display operatively in communication with the first data communicator and operative to display a representation of the visual and audio data in real-time, the display comprising a visual interface operatively connected to the data stream processor and comprising a human machine interface centralized display.

2. The system of claim 1, wherein the predetermined zone comprises an exclusion zone, a monitoring zone, an operational zone, an outer zone, and a bubble curtain.

3. The system of claim 1, wherein the plurality of sensors comprises an audio sensor, a visual sensor, and a geospatial sensor.

4. The system of claim 1, wherein the plurality of sensors comprises a subsea passive acoustic sensor, a subsea active acoustic sensor, a surface camera, a thermal imaging camera, a passive acoustic monitoring towed array, a passive acoustic monitoring static array, an acoustic buoy, a set of sensors on an unmanned platform, radar, automatic identification system (AIS), or GPS.

5. The system of claim 4, wherein the thermal imaging camera comprises a cooled mid-wave infrared (MWIR) camera or a long wave infrared (LWIR) thermal camera.

6. The system of claim 1, wherein the sensors are located on a platform.

7. The system of claim 1, wherein real time monitor is operatively in communication with the plurality of sensors wirelessly.

8. The system of claim 1, wherein:
   a) the second data communicator is operatively in communication a remote sensor;
   b) the second data communicator is operatively in communication an adjustable remote screen; and
   c) the second data communicator is configured to allow remote operation from a data command center.

9. The system of claim 1, further comprising:
   a) a data input port; and
   b) a remote sensor operatively in communication with the data input port.

10. The system of claim 9, wherein the remote sensor comprises a drone sensor, an AUV sensor, a UAV sensor, a passive acoustic monitoring hydrophone (PAM) sensor, a manual data entry sensor, a PAM audio channel sensor, a mammal vocalization recorder, an MWIR camera recorder, or a monopile center.

11. The system of claim 1, wherein:
   a) the representation of real-time data comprises selectively added or removed visually perceptible data layers representative of data present in the received data stream on demand; and
   b) the display being operative to display the representation of real-time data further comprises a data layer selector.

12. The system of claim 1, wherein the representation of real-time data comprises a representation of an automatic identification system (AIS) grid, a day/nighttime display option, an exclusion zone (EZ) designation, a heads up or gyro display orientation, and a set of target symbols.

13. The system of claim 1, wherein the display comprises:
   a) a screen populated with collated data in map form creating a visualizing of nearby mammals and marine traffic; and b) an indicator as to whether or not piling can occur based on proximity of marine mammals.

14. The system of claim 1, wherein the display comprises a configurable, predetermined set of color indicators indicative whether or not operations can continue, the configurable, predetermined set of color indicators indicative of:
   a) a border associated with pile driving needing to stop;
   b) a border associated with pile driving being allowed, but a mammal is approaching an operational area;
   c) a border indicative that operations are permissible;
   d) ambient noise and sound pulses generated by pile driving operation;
   e) visualization of mediation from a near field and a far field, comprising shade variations that dissipate across the display; and
   f) a numeric colored spectrum bar representative of a noise level band.

15. The system of claim 1, wherein the display further comprises a representation of an exclusion zone radius, a far field bubble curtain 1 location, a far field bubble curtain 2 location, or a near field device.

16. A method of presenting, in real-time, sensory data obtained regarding a set of subsea condition using a system comprising a plurality of sensors, a predetermined subset of the plurality of sensors operational without requiring daylight, the plurality of sensors operative to deliver data comprising target description data and target position data; a first data communicator operative to provide real-time data to a data viewer; a data processor operatively in communication with the plurality of sensors and the first data communicator, comprising a real time monitor operatively in communication with the plurality of sensors; a recorder operative to record visual and audio data gathered from the plurality of sensors in real time and provide a data stream comprising the visual and audio data gathered from the plurality of sensors; a data stream processor operative to process the data streams received from the recorder into a predetermined set of specific information; and a second data communicator operatively in communication with the data stream processor and the first data communicator in real time; and a display operatively in communication with the first data communicator and operative to display a representation of the visual and audio data in real-time, the display comprising a visual interface operatively connected to the data stream processor and comprising a human machine interface centralized display, the method comprising:
   a) installing the system at a subsea location comprising an offshore operations area;
   b) using the plurality of sensors to obtain data related to sensed subsea objects;
   c) aggregating information present in a set of incoming data streams collected from the plurality of sensors tasked with monitoring an ongoing mammal and human activities within the offshore operations area;
   d) time stamping a predetermined subset of the set of incoming data streams related to activity in the offshore operational area;
   e) organizing and recording data contained within the time stamped predetermined subset of the set of incoming data streams;
   f) performing algorithmic manipulation on the organized and recorded data to create a set of data which distinguish between a predetermined set of marine mammals and subsea noise created by installation of subsea foundations and the construction activity it creates; and
   g) displaying the set of data on the display.

* * * * *